US011917510B2

(12) United States Patent
Griffin et al.

(10) Patent No.: US 11,917,510 B2
(45) Date of Patent: *Feb. 27, 2024

(54) BLUETOOTH LOW ENERGY (BLE) PRE-CHECK IN

(71) Applicant: PAYPAL, INC., San Jose, CA (US)

(72) Inventors: Kent Griffin, Mountain View, CA (US); John Hastings Granbery, Los Altos, CA (US); Hill Ferguson, San Francisco, CA (US); David Marcus, Atherton, CA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/490,653

(22) Filed: Sep. 30, 2021

(65) Prior Publication Data

US 2022/0022017 A1    Jan. 20, 2022

Related U.S. Application Data

(63) Continuation of application No. 16/699,855, filed on Dec. 2, 2019, now Pat. No. 11,228,888, which is a
(Continued)

(51) Int. Cl.
*H04W 4/80*    (2018.01)
*G06F 21/10*    (2013.01)
(Continued)

(52) U.S. Cl.
CPC .............. *H04W 4/80* (2018.02); *G06F 21/10* (2013.01); *G06F 21/31* (2013.01); *G06F 21/35* (2013.01);
(Continued)

(58) Field of Classification Search
CPC .................................................... G06F 16/951
See application file for complete search history.

(56) References Cited

U.S. PATENT DOCUMENTS 7,610,616 B2    10/2009    Masuouka et al.
7,693,512 B1    4/2010    West
(Continued)

FOREIGN PATENT DOCUMENTS

CN    1750713 A    3/2006
CN    101783693 A    7/2010
(Continued)

OTHER PUBLICATIONS

International Preliminary Report on Patentability for Application No. PCT/US2014/053275 dated Mar. 17, 2016, 9 pages.
(Continued)

*Primary Examiner* — Ojo O Oyebisi
(74) *Attorney, Agent, or Firm* — HAYNES AND BOONE, LLP (57) ABSTRACT

One or more Bluetooth® low energy (BLE) beacons in communication with a remote server that provides check in capabilities and payment capabilities may be installed at a location. The BLE beacons may connect with a user's mobile device when the user enters the location and allow the user to check in to the location and authorize payments to be made at the location. Once the user is checked in to the location, the user may be provided with additional functionality, benefits, offers, and applications related to the location and facilitated by the check in. Further, the user may be pre-checked in into a next location when the user is at a current location.

20 Claims, 6 Drawing Sheets

Related U.S. Application Data continuation of application No. 14/479,200, filed on Sep. 5, 2014, now Pat. No. 10,499,224.

(60) Provisional application No. 61/874,587, filed on Sep. 6, 2013.

(51) Int. Cl.

| | | |
|---|---|---|
| *G06F 21/31* | (2013.01) | |
| *G06F 21/35* | (2013.01) | |
| *G06Q 20/12* | (2012.01) | |
| *G06Q 20/20* | (2012.01) | |
| *G06Q 20/32* | (2012.01) | |
| *G06Q 30/00* | (2023.01) | |
| *G06Q 30/0251* | (2023.01) | |
| *H04B 7/26* | (2006.01) | |
| *H04L 9/40* | (2022.01) | |
| *H04L 67/50* | (2022.01) | |
| *H04L 67/52* | (2022.01) | |
| *H04L 67/54* | (2022.01) | |
| *H04W 4/02* | (2018.01) | |
| *H04W 4/06* | (2009.01) | |
| *H04W 4/21* | (2018.01) | |
| *H04W 8/00* | (2009.01) | |
| *H04W 12/04* | (2021.01) | |
| *H04W 12/0431* | (2021.01) | |
| *H04W 12/06* | (2021.01) | |
| *H04W 12/50* | (2021.01) | |
| *H04W 40/24* | (2009.01) | |
| *H04W 48/10* | (2009.01) | |
| *H04W 76/11* | (2018.01) | |
| *H04W 76/34* | (2018.01) | |
| *H04L 9/06* | (2006.01) | |
| *H04W 12/02* | (2009.01) | |
| *H04W 12/71* | (2021.01) | |
| *H04W 12/75* | (2021.01) | |

(52) U.S. Cl.
CPC ............ *G06Q 20/12* (2013.01); *G06Q 20/20* (2013.01); *G06Q 20/3223* (2013.01); *G06Q 20/3224* (2013.01); *G06Q 20/327* (2013.01); *G06Q 30/00* (2013.01); *G06Q 30/0267* (2013.01); *H04B 7/26* (2013.01); *H04L 63/0876* (2013.01); *H04L 67/52* (2022.05); *H04L 67/535* (2022.05); *H04L 67/54* (2022.05); *H04W 4/025* (2013.01); *H04W 4/06* (2013.01); *H04W 4/21* (2018.02); *H04W 8/005* (2013.01); *H04W 12/04* (2013.01); *H04W 12/0431* (2021.01); *H04W 12/06* (2013.01); *H04W 12/50* (2021.01); *H04W 40/244* (2013.01); *H04W 48/10* (2013.01); *H04W 76/11* (2018.02); *H04W 76/34* (2018.02); *H04L 9/0631* (2013.01); *H04L 63/068* (2013.01); *H04L 63/0823* (2013.01); *H04W 12/02* (2013.01); *H04W 12/71* (2021.01); *H04W 12/75* (2021.01)

(56) References Cited

U.S. PATENT DOCUMENTS

| | | | |
|---|---|---|---|
| 7,831,061 B1 | 11/2010 | Lubard et al. | |
| 8,166,159 B2 | 4/2012 | Kalasapur et al. | |
| 8,774,778 B2 | 7/2014 | Faillaci et al. | |
| D717,309 S | 11/2014 | Govindarajan | |
| 8,972,296 B2 | 3/2015 | Govindarajan et al. | |
| 9,037,082 B2 | 5/2015 | Chatterton | |
| 9,531,772 B2 | 12/2016 | Deluca et al. | |
| 9,576,289 B2 | 2/2017 | Henderson et al. | |
| 9,886,727 B2 | 2/2018 | Curtis et al. | |
| 2003/0004743 A1 | 1/2003 | Callegari | |
| 2003/0191818 A1 | 10/2003 | Rankin et al. | |
| 2007/0013509 A1 | 1/2007 | Lakshmanan et al. | |
| 2008/0065892 A1 | 3/2008 | Bailey et al. | |
| 2008/0280624 A1 | 11/2008 | Wrappe | |
| 2009/0216093 A1 | 8/2009 | Sebastian et al. | |
| 2009/0299197 A1 | 12/2009 | Antonelli et al. | |
| 2009/0327135 A1 | 12/2009 | Nguyen et al. | |
| 2010/0063867 A1 | 3/2010 | Proctor, Jr. et al. | |
| 2010/0082481 A1 | 4/2010 | Lin et al. | |
| 2011/0010291 A1 | 1/2011 | Adams | |
| 2011/0021142 A1 | 1/2011 | Desai et al. | |
| 2012/0150669 A1 | 6/2012 | Langley et al. | |
| 2012/0166337 A1 | 6/2012 | Park et al. | |
| 2012/0233158 A1* | 9/2012 | Braginsky ......... G06F 16/24578 707/723 |
| 2012/0235812 A1 | 9/2012 | Maia et al. | |
| 2012/0252418 A1 | 10/2012 | Kandekar et al. | |
| 2012/0258669 A1 | 10/2012 | Honkanen et al. | |
| 2013/0065584 A1 | 3/2013 | Lyon et al. | |
| 2013/0099920 A1 | 4/2013 | Song et al. | |
| 2013/0109323 A1 | 5/2013 | Ruutu et al. | |
| 2013/0124630 A1 | 5/2013 | Reunamaki et al. | |
| 2013/0173315 A1 | 7/2013 | Dorsey | |
| 2013/0217332 A1 | 8/2013 | Altman et al. | |
| 2013/0225197 A1 | 8/2013 | McGregor et al. | |
| 2013/0251216 A1 | 9/2013 | Smowton et al. | |
| 2014/0108241 A1 | 4/2014 | Tunnell et al. | |
| 2014/0114780 A1 | 4/2014 | Menefee et al. | |
| 2014/0172700 A1 | 6/2014 | Teuwen et al. | |
| 2014/0188708 A1 | 7/2014 | Govindarajan et al. | |
| 2014/0188733 A1 | 7/2014 | Granbery | |
| 2014/0254466 A1 | 9/2014 | Wurster et al. | |
| 2015/0051977 A1 | 2/2015 | Lyman et al. | |
| 2015/0063472 A1 | 3/2015 | Chatterton | |
| 2015/0073980 A1 | 3/2015 | Griffin et al. | |
| 2015/0094080 A1 | 4/2015 | Bleecher et al. | |
| 2015/0332258 A1 | 11/2015 | Kurabi et al. | |
| 2015/0356289 A1 | 12/2015 | Brown et al. | |
| 2022/0303745 A1 | 9/2022 | Arvidson et al. | |

FOREIGN PATENT DOCUMENTS

| | | | |
|---|---|---|---|
| CN | 103269326 A | 8/2013 | |
| EP | 1986121 A2 | 10/2008 | |
| EP | 1986121 A3 | 5/2010 | |
| JP | 2005122747 A | 5/2005 | |
| JP | 2005523500 A | 8/2005 | |
| JP | 5129404 B1 | 1/2013 | |
| JP | 2013258487 A | 12/2013 | |
| WO | 03088108 A1 | 10/2003 | |
| WO | 2013186943 A1 | 12/2013 | |

OTHER PUBLICATIONS

Extended European Search Report for European Application No. 14/842,008 dated Jul. 3, 2017, 13 pages.

International Search Report and Written Opinion for International Application No. PCT/US2014/053275 dated Nov. 21, 2014, 9 pages.

\* cited by examiner

BLUETOOTH LOW ENERGY (BLE) PRE-CHECK IN

RELATED APPLICATIONS

This application claims priority and the benefit to U.S. patent application Ser. No. 16/699,855, filed on Dec. 2, 2019, which claims priority and benefit to U.S. patent application Ser. No. 14/479,200, filed on Sep. 5, 2014, which claims priority and benefit to U.S. Provisional Application No. 61/874,587, filed Sep. 6, 2013, the entire disclosure of which is incorporated herein by reference.

BACKGROUND

Technical Field

Embodiments disclosed herein are related to checking in using Bluetooth® low energy (BLE) beacons installed at a location.

Related Art

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. Technology advances have also allowed for a wider variety of devices and transaction types in the retail and other marketplaces.

One example of a relatively new development within the realm of electronic commerce is the ability to allow a consumer to pay for a good or service at a point of sale through the use of his or her smart phone, wearable device, or other personal mobile device. A user merely needs to have an appropriate payment application or "app" on his or her device, whereupon the user can present his or her phone or other similar device at an appropriate time and location at a retail or other establishment. The retailer or other seller or service provider can then "checkin" the given user through some process of reading his or her smart phone or other similar device, after which the seller or service provider can accept payment or credit through some form of communication with the checked in or acknowledged device. This "checkin" ability to accept payment or credit without the use of cash, checks, credit cards, or other traditional payment means can be particularly helpful in many settings.

Unfortunately, such setups are not without their own drawbacks and inconvenient features. In many instances, the current checkin process can be time consuming. For example, current checkin procedures often require the customer to take out his or her phone or other device at a point of sale or to show a barcode in order to make a payment or provide credit information. This often involves the device searching for the appropriate wireless connection at the store, searching for the store among many possible choices on the device, and/or manual user input or selection on his or her personal mobile device, all of which can time-consuming and inconvenient. Even small amounts of time that are less than a minute can be frustrating where other consumers are waiting in line behind the user at a register or other point of sale. Further, where the checkin devices in the store are unable to locate and/or checkin a customer, such as due to excessive network use or technical problems, the benefits of a checkin may not be offered to the customer.

BRIEF DESCRIPTION OF THE FIGURES

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

In an embodiment, a system or a method may be provided to pre-check in a user prior to the user entering a location. In particular, at location A, the user may pre-check into location B, before the user travels to or arrives at location B. For example, the user may pre-check into a building, a doctor's office, a hotel, or other places that may check in the user.

In an embodiment, the system may monitor and analyze the user's travel or shopping patterns or habits to identify and/or authenticate the user prior to the user arriving at the actual destination. For example, the user's travel or shopping patterns in a merchant's store may be analyzed to identify and/or authenticate the user. The system may then infer or predict a next possible location or destination of the user based on the user's travel, calendar, or shopping pattern and pre-check in the user into the next possible location or destination. In an embodiment, based on a series of check-ins at different locations, the system may identify the user using the user's check-in history. Further, the system may automatically pre-check in the user to a next destination when the user is following a pattern of a series of routine check-ins or is otherwise determined or predicted to be going to the next destination.

In an embodiment, the system may monitor the user's movement inside a merchant's store and may identify the user based on the user's shopping route history. The system then may pre-check in the user into a next routine destination accordingly. The system may determine that the user will be going to store B based on calendar information, based on the current location of the user, based on the current direction of travel, based on a current purchase by the user, based on information from social networks (e.g., the user or another posting that the user will be at a store B), and any other information that can be used to determine where the user may be going that would benefit from a checkin. In an embodiment, the information for determining the user's location may be gathered by a merchant or at a merchant's POS. For example, the merchant may provide instructions or suggestions for the user to visit a next location and may check the user into the next location accordingly. As such, the user may be checked in prior arriving at a location so that the user can immediately obtain benefits from a checkin.

Figure 1:
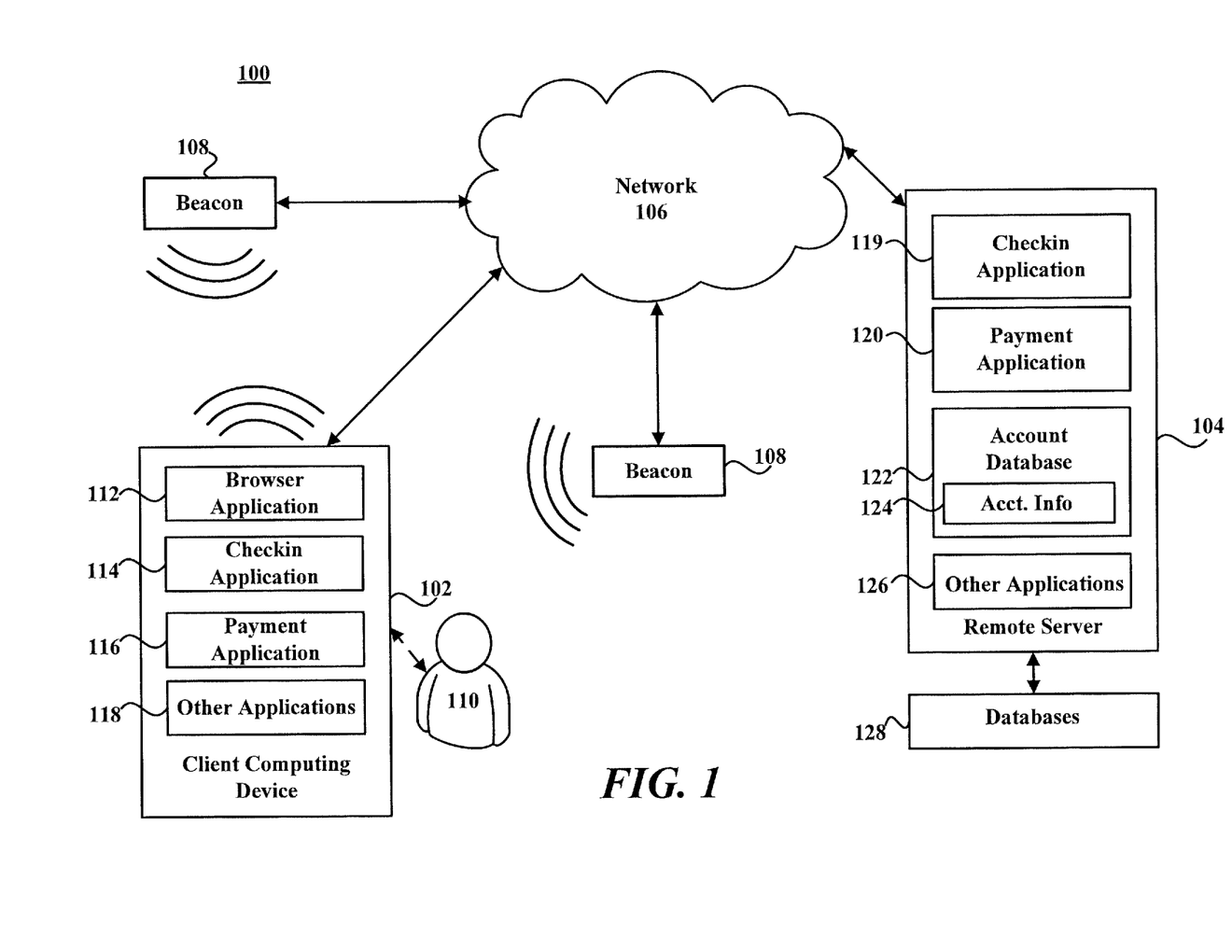
FIG. 1 is a block diagram of a networked system, consistent with some embodiments.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, CA Remote server 104 may be maintained by other service providers in different embodiments. Remote server 104 may also be maintained by an entity with which sensitive credentials and information may be exchanged with client computing device 102. Remote server 104 may further be one or more servers that hosts functionality for users to "check in" to a location, event, and the like. Checking in may provide the user that checks in with special offers, deals, services (such as easier/faster payments), and the like, and may let the merchant or other proprietor of the location or event know that the user is there. The user may also check in to a location for social purposes to let friends and contacts of the user know that they have checked in. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, a smart watch, and/or various other generally known types of computing devices.

As shown in FIG. 1, system 100 may include one or more beacons 108. In some embodiments, beacons 108 may be installed at a merchant location, such as a store, restaurant, and the like. In some embodiments, beacons 108 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meters or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as client computing device 102 capable of receiving information from beacons 108 comes within the range of a beacon 108, the device may receive a transmission from a beacon 108 and be instructed to perform an action, such as display an advertisement or notification, such as "PayPal accepted here" or "store closing in 10 minutes", execute a payment application, displaying notifications, or check a user 110 in to a particular location. In some embodiments, beacon 108 may be in communication with remote server 104 over network 106 through wireless or wired connection.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access web sites to find and purchase items, as well as access user account information or web content.

Client computing device 102 may also include a check in application 114 that may allow user 110 to check in to a location using a check in platform or service such as may be provided by PayPal, Inc. of San Jose, CA, Foursquare of New York, NY, Facebook, Inc., of Menlo Park, CA, or Google+ of Google, Inc. of Mountain View, CA, and implemented by remote server 104. In some embodiments, check in application may include multiple application programming interfaces (APIs) for checking in to one or more of the check in platforms or services. In some embodiments, checking in to a location while visiting a location such as a merchant physical storefront may provide user with exclusive deals, offers, or may allow user to purchase and pay for items.

Client computing device 102 may also include a payment application 116 that may be used by user 110 using client computing device 102 to make a payment. In some embodiments, payment application 116 may be configured to make a payment using remote server 104 as a payment processor.

In some embodiments, functionalities provided by check in application 119 and payment application 120 may actually be provided by a single application. Client computing device 102 may include other applications 118 as may be desired in one or more embodiments to provide additional features available to user 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by an online payment provider, such as PayPal, Inc. of San Jose, CA, which may provide processing for online financial and information transactions on behalf of user 110. Remote server 104, according to some embodiments, may also be maintained by a service that processes check ins so that a proprietor of a location, such as a merchant, or others know that user 110 is at the location. Remote server 104 may also be capable of providing access to a merchant's goods and services (collectively referred to as "items") that are for purchase and may provide a payment service processing for the purchased items. Remote server 104 may include at least check in application 119, which may be configured to interact with client computing device 102 connected to network and remote server 104 to check user 110 in to a location. In some embodiments, checking client computing device 102 in to a location may allow user 110 and client computing device 102 to access features, specials, offers, and the like offered by the location. In some embodiments, these features, specials, offers, and the like may be provided and processed by remote server 104 on behalf of the merchant associated with the location.

Remote server 104 may also include a payment application 120 that may facilitate processing payments for user 110 to merchants, for example. In some embodiments, payment application 120 may be configured to interface with payment application 116 to receive payment details, user information, merchant information, and additional information for processing a payment on behalf of user 110. Payment application 120 may also be capable of interfacing with check in application 119 such that when a check in is processed, a payment may be authorized for the location in which user 110 is checking in to. In some embodiments, functionalities provided by check in application 119 and payment application 120 may actually be provided by a single application. Remote server 104 may also include an account database 122 that includes account information 124 for users having an account on remote server 104, such as user 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of user 110.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
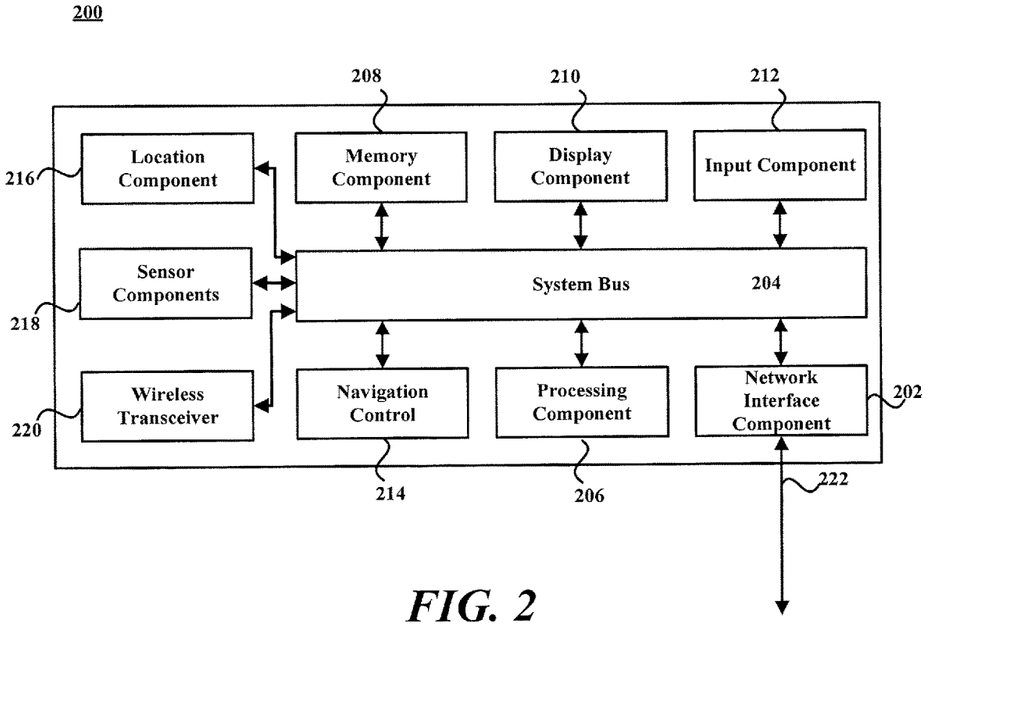
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 120 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
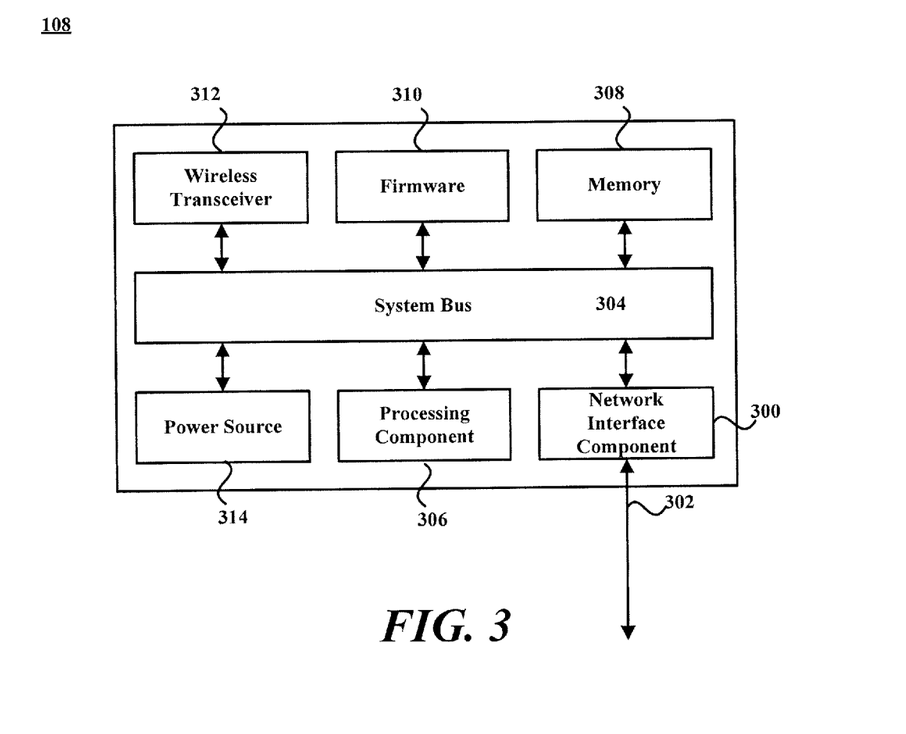
FIG. 3 is a diagram illustrating a beacon, consistent with some embodiments.

FIG. 3 is a diagram illustrating a beacon 108, consistent with some embodiments. As shown in FIG. 3, beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including radio frequency (RF), microwave frequency (MWF), and/or infrared (IR) components configured for communication 302 with network 106. Consistent with other embodiments, NIC 300 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Beacon 108 also includes a system bus 304 for interconnecting various components within beacon 108 and communicating information between the various components. Such components include a processing component 306, which may be one or more processors, micro-controllers, graphics processing units (GPUs) or digital signal processors (DSPs), a memory component 308, firmware 310 and one or more wireless transceivers 312 that may each include an antenna that is separable or integral and is capable of transmitting and receiving information according to one or more wireless network protocols, such as Wi-Fi™ 3G, 4G, HDSPA, LTE, RF, NFC, IEEE 802.11a, b, g, n, ac, or ad, Bluetooth®, BLE, WiMAX, ZigBee®, etc. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using wireless transceivers 312 based on instructions stored in memory 308 and/or firmware 310 executed by processing component 306. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to checking in to a merchant associated with beacon 108. In some embodiments, beacon 108 may also transmit instructions that when received by client computing device 102 may cause check in application 114 or payment application 116 to be executed by processing component 206 to cause client computing device 102 to perform a check in at the merchant associated with beacon 108. Further, beacon 108 may transfer instructions that, when received by client computing device 102 cause payment application 116 to be executed by processing component to allow user 110 to authorize a payment to be processed by remote server 104. In some embodiments, wireless transceiver 312 may correspond to a BLE transceiver configured to transmit and receive information according to the BLE protocol. In some embodiments, beacon 108 may be a BLE beacon or dongle such as described in U.S. patent application Ser. No. 13/938,860, filed on Jul. 10, 2013, the entire contents of which are hereby incorporated by reference in their entirety. Further, BLE beacon 108 may have a design such as shown in U.S. Design Application No. 29/455,720, filed May 23, 2013, the entire contents of which are also incorporated herein by reference in their entirety.

As will be readily appreciated, the foregoing networks, systems, devices, methods and variations thereof can be used to implement an automated checkin of users at a cooperating or subscribing establishment, such that subsequent purchase transactions and other activities can be more streamlined and convenient. Rather than having users resort to known procedures involving wireless checkins with their own personal mobile devices at a point of sale, a more user friendly system involving the use of Bluetooth Low Energy ("BLE") in association with separate user phones, other mobile devices or any suitable user computing devices can be provided. One or more applications or "apps" can be provided for download and use on client computing device 102 to help facilitate the use of the automated checkin process. In various embodiments, such automated checkins can be facilitated by a transaction service provider, such as, for example, PayPal Inc. of San Jose, California, provided by remote server 104.

Bluetooth low energy ("BLE") is a relatively new feature of Bluetooth 4.0 wireless radio technology. BLE is intended for primarily low-power and low-latency applications for wireless devices within a short range, such as up to about 50 meters. Devices using BLE utilize a protocol having intermittent communications, smaller amounts of data transfer and bandwidths, as well as low duty cycles. As such, BLE can consume only a fraction of the power of traditional Bluetooth enabled products for Bluetooth communications. In many cases, BLE products will be able to operate more than a year on a tiny battery without recharging. The use of BLE can allow for a wider variety of applications in relatively low power devices, such as client computing device 102.

In various embodiments, it is specifically contemplated that client computing device 102 may be equipped with BLE capabilities and, thus, can be provided with programs or "apps" that leverage the use of these capabilities to allow for the automated checkins of owners or users carrying those devices when they are merely in or at a participating establishment, such as check in application 114 and payment application 116. BLE allows for constant passive scanning for Bluetooth peripherals. A suitable program or app on client computing device 102 can be set to run frequently in the background under a BLE protocol, always monitoring for a significant change in location and/or presence of an appropriate BLE peripheral at a merchant or vendor. When user 110 having client computing device 102 enters a store or other participating location, he or she would pass by a BLE peripheral, such as beacon 108 by the entrance or at some other appropriate location. Beacon 108 can be sending out a signal, such as for advertising a checkin service with a universally unique identifier ("UUID") and store information.

It is worth noting that the communication process between beacon 108 and client computing device 102 can take place on an unencrypted channel. This is significant in that the communications between the devices actually involve a financial transaction, the details of which can be detected by any party due to the unencrypted nature of the communication. While the use of an unencrypted channel provides greater speed and flexibility for the use of many different devices, certain precautions should be taken to protect the sensitive nature of the financial or other consumer transaction. This can be accomplished by providing, for example, tokens for the devices to identify each other only in a generic fashion, with all sensitive information being retained remotely by a financial processing entity or other service provider. Also, since communications take place over unencrypted channels, there is no reason for a device to retain long term specific identifiers or information that is typically needed for bonded or encrypted communications.

Client computing device 102 would wirelessly detect or "see" beacon 108 due to the constant background running of the app under a BLE protocol. Once detection is made at a low or lowest energy level and duty cycle, a ramp up in energy, duty cycle, and/or other operating parameters can take place so that a handshake and checkin can take place automatically between the client computing device 102 and beacon 108. In particular, client computing device 102 can connect to the service at the store, merchant or other location, encrypt a payment token along with the beacon token and write it to the service. If the merchant possesses the necessary keys to decrypt the payment token, the information could then be decrypted and used directly by the merchant themself. Alternatively, the information may be passed by the peripheral or other component up to a remote third party payment provider, such as for example, PayPal, and hosted by remote server 104. Remote server 104 can then decrypt the payment token and execute a checkin at the establishment on behalf of user 110. Later, when user 110 approaches a checkout aisle or other point of sale, another beacon 108 advertising a checkout service can be present. Various checks and processes can then take place based on the transmit power and received power of beacon 108, client computing device 102, or both, and client computing device 102 can again write credentials to the checkout service. This associates user 110 with a particular register. Checkout can then proceed as normal for a checkin payment. In some embodiments, after an initial checkin, client computing device 102 may be capable of advertising a one-time use UUID for beacon 108. When beacon 108 receives the advertised UUID, beacon 108 would attempt to establish communications with client computing device 102.

In order for the actual handshake and communication between beacon 108 and client computing device 102 to be effective over an unencrypted channel, it is important that both devices already be initialized and signed up for the same remote third party service provider, such as PayPal or any other suitable provider. Each device can then be provided with public encryption keys, private encryption keys and payment tokens prior to meeting each other, such that the devices are able to recognize each other as belonging to the proper service when the signals are detected and the handshake begins. Information is then exchanged purely by way of keys and payment tokens, such that no sensitive information is ever exchanged over the unencrypted channel.

With the use of BLE and appropriate apps or programs on user devices, this entire process can be automated in many instances. This can save significant amounts of time and inconvenience for user 110 at the point of sale. In some embodiments, a beep, other sound, vibration, visual display or other output from the smart phone or other mobile user device can be provided upon automatic checkin. This can simply provide a notice to user 110 that they are now checked in at the establishment. Different sounds or indicators on a display can confirm to user 110 which establishment(s) user 110 is currently checked in, such as where malls or other locations having multiple vendors in a small area might be applicable. In this manner, user 110 can be made aware that he or she is checked in and is able to readily shop here and check out quickly.

In various further embodiments, other procedures can be implemented to take advantage of the knowledge that user 110 is at a given merchant location and that a purchase or other point of sale activity might be imminent. The bidirectional nature of BLE can allow for a more robust experience and interaction between the merchant, user 110, and/or third party payment service provider, such as may be provided and hosted by remote server 104. For example, advertising and promotional offers can be directed to a known user from the merchant, the payment service provider, or both. These items can rely on a known history and other parameters applicable to the specific user. For example, notices can be provided regarding sales or promotions on items or related items that are known to be of interest or the subject of past purchases by a known user. Also, a step-up procedure to assess risk can be implemented, such that the user can be prompted for a PIN or other identifier if there is any concern over risk for that user or about a particular purchase. In addition, a customized offer of credit can be made for the user based upon various known factors in the associated customer account, history or profile. In various embodiments, a signal to client computing device 102 to buzz or emit a sound or display can be provided if the merchant or third party payment service provider might need a PIN or other verification at the time of purchase. The bidirectional nature of the BLE also may allow a user to choose to ignore certain BLE beacons going forward. For example, the user may choose to ignore a BLE that notifies users with certain advertisement, such that the user may not be bothered by the same advertisement again.

Figure 4:
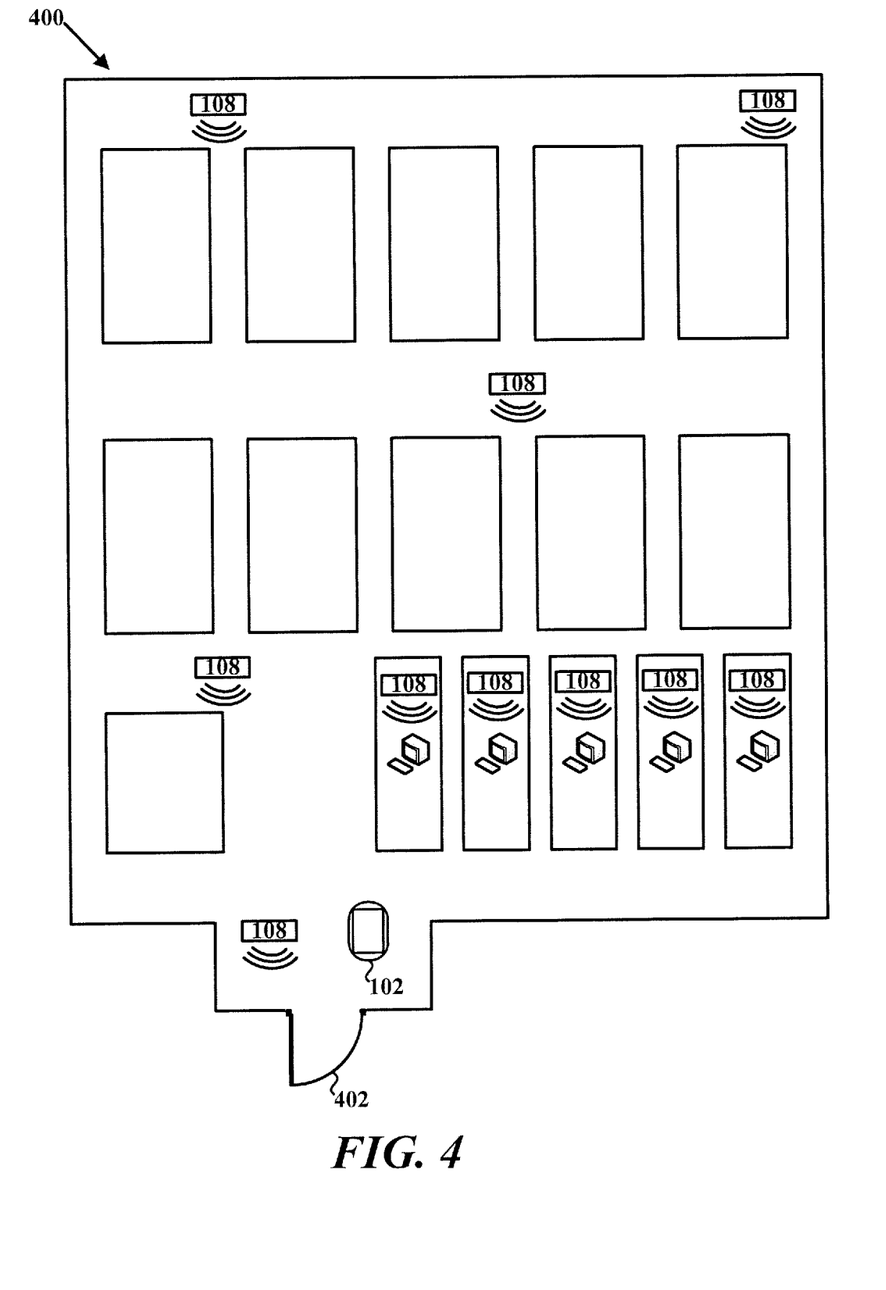
FIG. 4 is a diagram illustrating a location having multiple beacons throughout the location.

FIG. 4 illustrates in block diagram format an exemplary merchant location 400 and associated system components adapted for implementing the purchase of goods or services using automatic wireless consumer checkins according to some embodiments. It will be readily appreciated that this particular layout of merchant location 400 is only provided for purposes of illustration, and that many other types of layouts, devices, procedures and the like could be effectively implemented using the various principles of the present disclosure.

Merchant location 400 includes an indoor store floor having a number of beacons 108. In some embodiments, beacons 108 may be BLE beacons. These devices can be distributed strategically throughout merchant location, such as near a front door 402, at central locations, and/or at locations of high volume traffic within the establishment. One or more client computing devices 102, such as phones, PDAs, tablets, wearable devices, or the like, can interact with one or more of the beacons 108 throughout the store. For example, the location of the user may be detected by a grid of BLE beacons by the triangulation technique. Preferably, only one interaction with a beacon is needed for a checkin, although it may be useful for an establishment to know where user 110 is located and/or user 110 travel and shopping patterns or habits within a store. Such further information can be used to provide further advertising and promotional offers (e.g., related to something at or near where the user is physically located), predict a subsequent checkin location for user 110, and/or to authenticate the actual user versus one who may have stolen or is otherwise using the mobile device in an unauthorized fashion. Such further authentication can involve checking known user 110 traffic and shopping patterns against what is currently happening for a given device 102.

An actual automatic checkin process can involve a subscribed or affirmatively active user 110 entering a merchant location 400, whereupon client computing device 102 associated with user 110 has a low level background program running that detects a low level BLE signal from one or more beacons 108 in the store. Client computing device 102 can then "wake up" and communicate on a more active level with beacon 108. In some embodiments, a UUID and token can be generated and assigned to client computing device 102 for a particular time, location and session, with appropriate expiration and other safeguards in place to protect against fraud or other misuse. For example, a period of one or two hours might suffice for a typical checkin session or event.

The UUID, token, and other informational items can be exchanged between beacon 108 and client computing device 102, whereupon client computing device 102 (and user 110) are "checked in" at that location and are ready to make a purchase or otherwise check out at some later time. In some embodiments, beacon 108 may further communicate with remote server 104 over network 106 to check client computing device 102 and user 110 in at the location. In some embodiments, the check-in process may be the same or similar to the check-in process described in U.S. patent application Ser. No. 13/938,860, filed on Jul. 10, 2013, the entire contents of which are hereby incorporated by reference in their entirety. Other informational items exchanged or provided can include the store type, name and number, store location or address, actual or likely items of interest for purchase by user 110, a user history at that location, similar locations, and/or overall, the uniquely identified user 110, a maximum amount of credit or currency available overall to the user for an automated purchase, the amount of credit or currency that may be used without a PIN or other affirmative user authentication being required, among other possibilities. This information can be stored on client computing device 102 for a session or longer, can be provided to the store or other establishment, and can also be provided to a remotely owned and controlled separate payment service provider.

After checkin, various intermediate transactions, offers, credit or risk assessments can take place, whereupon check out or purchase can take place at any of a number of terminals or registers each having a beacon 108, such that the presence or close proximity of one or more checked in client computing devices 102 can be read. If needed, authentication of user 110 can be had by way of a manual PIN entry, a fingerprint scan, a manual facial recognition by store personnel, and/or the like. Automated or automatic check in processes using GPS, triangulation, a signal strength of different client computing devices 102 to different terminals, and/or the like to estimate where a particular client computing device 102 is located in the checkout process may be provided.

In some embodiments, user 110 may perform a pre-check in prior to entering location 400. For example, user 110 may engage check in application 114 to check in to location 400 from a different location. Check in application 119 of remote server 104 may process this check in and send information to client computing device 102 that may be stored in memory component 208 of client computing device 102. The information may include a UUID, such that when user enters location 400 and connects with a beacon 108, the UUID may be used to check user 110 into location 400. User 110 may also be presented with an option to automatically check in in the future.

In some embodiments, a display readout of several possible client computing devices 102 can be presented to store personnel, such that the right device 102 or user 110 can be readily picked from a subset of all presently checked in devices 102 and users 110. For example, the 3 or 5 most likely devices/users for a given checked in customer that is trying to check out can be presented on a terminal or register for a store clerk. A quick verification of the correct device/user can be made by the clerk, whereupon the final payment and check out process is quickly consummated and finished. In the event that the small subset of 3 or 5 most likely devices 102 does not have the correct device for the customer that is immediately before the clerk, an available input can allow the clerk to expand the possible number of likely choices to 10, 20 or even all currently checked in devices. In the event that the present customer/user/device can still not be found on the menu of selections available to the clerk, then a re-checkin process can take place at the terminal or register itself.

As shown in FIG. 4, each terminal or register may have a beacon 108. In some embodiments, the terminals or registers may have a point-of-sale (POS) system installed thereon which may be provided by remote server 104 and be in communication with remote server 104 for processing payments for items being purchased by user 110 having client computing device 102 in communication with beacon 108 at or near the terminal or register. However, when user 110 having client computing device 102 goes to a terminal or register, client computing device 102 may be in communication with more than one beacon 108. As a result, the POS functionality of the terminals or registers may include multi-lane disambiguation that filters client computing devices 102 that have checked in to beacons 108 associated with the particular terminal or register. In some embodiments, client computing device 102 may send a heartbeat signal to beacon 108 that may include a transmission power used to send the signal. Beacon 108 may compare this to their transmission power to determine a relative strength of communication with client computing device 102 to determine how far away from beacon 108 client computing device 102 is.

Alternatively, the POS functionality of the terminals or registers may be able to filter out checked-in devices 102 and users 110 who are not in the lane or area next to a particular register or terminal and its associated beacon 108. In some embodiments, this may be accomplished by assigning client computing device 102 a UUID when user 110 having client computing device 102 initially checks in to location 400. The beacon 108 that assigned the UUID to client computing device 102 may then share the assigned UUID with other beacons 108 in location 400 such that when client computing device 102 enters into communication with another beacon 108, that beacon 108 will know that the particular user 110 having client computing device 102 is within a predetermined radius of that beacon 108. As a result, the location of user 110 and client computing device 102 may be tracked while user 102 having client computing device 102 remains within location 400. Moreover, if no beacon 108 in location 400 sees the particular assigned UUID associated with user 108 and client computing device 102, a determination may be made that user 102 is no longer in location 400, or has powered off client computing device 102 or has disabled the BLE transmission capability on client computing device 102.

Moreover, beacons 108 may also determine a position of user 110 having client computing device 102 based on a transmission power associated with the communications between a beacon 108 and client computing device 102. In some embodiments, packets sent between beacon 108 and client computing device 102, such as may be sent during a heartbeat transmission, may include a transmission power, such that successive packets received from client computing device 102 by beacon having an increasingly lower power may be an indication that client computing device 102 is getting closer to beacon 108.

In some embodiments, all of the beacons 108 in location 400 may be temporarily placed in broadcast mode such that the beacons 108 broadcast messages to the other beacons in location 400. Using the relative signal strengths of the messages received from other beacons 108, a map may be created to show the location of beacons 108 within location 400.

In some embodiments, as user 110 having client computing device 102 walks around the store or merchant location, the location of user 110 and client computing device 102 may be determined according to the beacon 108 that client computing device 102 is communicating with and has used to check in with, along with a signal strength related to the communications between client computing device 102 and beacon 108. As a result, client computing device 102 may receive targeted advertisements based on the location in the store or merchant location. In addition, section-specific offers may be delivered to client computing device 102. These section-specific offers may also be time-based, such that they are delivered to client computing device 102 when it is determined that user 110 having client computing device 102 has been in the section for longer than a predetermined period of time, or will be offered to the next user 110 in that section if the previous user 110 did not purchase anything. In some embodiments, information about user 110, such as check ins, what user 110 purchased, which advertisements, offers, or coupons, user 110 redeemed in location may be shared with other locations, such that when user 110 checks in at the other location, advertisements and offers may be better tailored to user 110.

In some embodiments, user 110 may be delivered coupons or offers upon entering merchant location 400. For example, when user enters merchant location 400 through door 402, client computing device 102 associated with user 110 may communicate with one or more beacons 108 at or near door 402 and check-in to merchant location 400 as described above. Client computing device 102 may then receive and display notifications of the coupons or offers. User 110 may then be able to interact with the displayed notifications, coupons, and offers to view them and save them in using check-in application 114 and/or payment application 116. In some embodiments, the offers or coupons, or even advertisements may be sent to client computing device 102 prior to user 110 arriving at location. These offers, coupons, and advertisements may be designed to entice user 110 to visit location 400 and the offers, coupons, or advertisements may be automatically redeemed when user 110 enters location, client computing device 102 communicates with beacon 108 and checks in to location 400.

In some embodiments, user 110 may be provided personal assistance when entering merchant location 400. For example, when user enters merchant location 400 through door 402, client computing device 102 associated with user 110 may communicate with one or more beacons 108 at or near door 402 and check-in to merchant location 400 as described above. Client computing device 102 may then display a welcome message to user 110 and display a prompt or notification requesting user 110 input regarding whether or not user 110 needs assistance. If user 110 selects an option for assistance, a sales associate in merchant location may be alerted on a merchant device, similar to client computing device 102 but having merchant-specific applications executing thereon, that user 110 requires assistance. In some embodiments, the merchant device may also be in communication with one or more beacons 108. In some embodiments, the sales associate may be able to retrieve information about user 110 from remote server 104 or other sources based on the identifier assigned to client computing device 102.

In some embodiments, user 110 may be provided location-specific information when entering merchant location 400. For example, when user enters merchant location 400 through door 402, client computing device 102 associated with user 110 may communicate with one or more beacons 108 at or near door 402 and check-in to merchant location 400 as described above. Client computing device 102 may then receive location-specific information that may be displayed by client computing device 102. The location-specific information may include a map of merchant location 400, the available inventory within location 400, online reviews and tips, and if merchant location 400 is a restaurant, a menu. In some embodiments, the available inventory may be provided by Milo of San Jose, CA.

In some embodiments, user 110 may be able to announce that they are here when entering merchant location 400. For example, when user enters merchant location 400 through door 402, client computing device 102 associated with user 110 may communicate with one or more beacons 108 at or near door 402 and check-in to merchant location 400 as described above. Merchant devices or terminals may then receive the announcement that user 110 has checked in and may be able to view a photograph or other information associated with user 110. This may be useful when checking in for an appointment at a doctor's office, or registering at a hotel. In some embodiments, user 110 may be able to use this functionality to register or sign in to a building as a visitor. Instead of being given a pass, or temporary badge, user 110 may be able to use check in application 114, which may display a photograph of user 110 which a person having a merchant device, terminal or similar, can match to their list of people that have checked in. For example, if client computing device 102 associated with user 110 enters a secure building where user 110 is required to wear a badge, client computing device 102 may connect to a beacon 108 in the building and client computing device 102 may display a prompt for signing in or requesting a visitor badge. In some embodiments, beacon 108 may determine an identity of user 110 through remote server 104 and attempt to determine if user 110 is an employee or a guest in need of a temporary badge.

In some embodiments, user 110 may be able to check in to merchant location 400 and provide payment authorization, as described above. Moreover, payment application 116 and/or check in application 114 may prompt user 110 before completing a payment from an account to user 110 to authorize the payment. In some embodiments, user 110 may be prompted to enter a personal identification number (PIN) to authorize a payment. In some embodiments, any payment authorization may be canceled if a client computing device 102 is no longer in communications with beacon 108, or a signal strength with beacon is too weak. In some embodiments, user 110 may be prompted to initially opt-in to payment authorizations at merchant location 400.

In some embodiments, user 110 may be notified of payment acceptance when entering merchant location 400. For example, when user enters merchant location 400 through door 402, client computing device 102 associated with user 110 may communicate with one or more beacons 108 at or near door 402 and check-in to merchant location 400 as described above. Client computing device 102 may then be notified that merchant location 400 accepts payments processed by remote server 104, for example. User 110 may also be provided with an option to automatically check in to merchant location on future visits.

In some embodiments, user 110 may be able to retrieve items that user 110 has previously ordered when entering merchant location 400. For example, user 110 using client computing device 102 or other device may be able to access a catalog, menu, or other merchant interface over network, select items for purchase, and authorize a payment for the purchase. Then, when user 110 enters merchant location 400 through door 402, client computing device 102 associated with user 110 may communicate with one or more beacons 108 at or near door 402 and check-in to merchant location 400 as described above. Merchant devices, terminals, and/or registers may then be notified that user 110 is at merchant location and be able to retrieve items that user 110 has previously ordered online, or if a restaurant or fast food location, can start preparing your meal. In some embodiments, when client computing device 102 and beacon 108 are in communication, client communicating device 102 may display a prompt or notification of food available for user 110 to order, including any favorite orders of user 110. User 110 can take action and indicate that they would like to order the food and authorize a payment.

In some embodiments, beacon 108 may be installed at a toll plaza such that when user 110 having client computing device 102 approaches the toll plaza, client computing device 102 may communicate with beacon 108 to perform a check in, as described above. User 110 may then be able to authorize a payment to pay for a toll. In some embodiments, the toll may be automatically authorized based on a successful check in, such that client computing device 102 only need to connect to beacon 108 and perform a check in to authorize a toll payment.

In some embodiments, beacon 108 may be installed on a train or subway and at stations along the route of the train or subway. When user 110 enters a train station, client computing device 102 associated with user 110 may connect to a beacon 108 at the train station and check in. When user 110 boards the train, client computing device 102 may then connect to another beacon 108 in or near the train car to check in to indicate that user 110 has actually boarded the train. Then, when user 110 exits the train at their stop, the train beacon 108 will no longer detect the UUID of user 110 to determine that user 110 has left the train. Client computing device 102 may then connect to a beacon 108 associated with the destination station and check in. A payment for the train fare may then be calculated based on the first and last station check ins, and a payment may be authorized for the calculated fare. In some embodiments, when user 110 checks in to a train, information about user 110 may be provided by remote server 104 to a conductor of the train and displayed on a conductor device which may be similar to client computing device 102 or a merchant device, such that the conductor can see that user 110 is on the train and will be paying a fare based on authorizing a payment through remote server 104.

Figure 5:
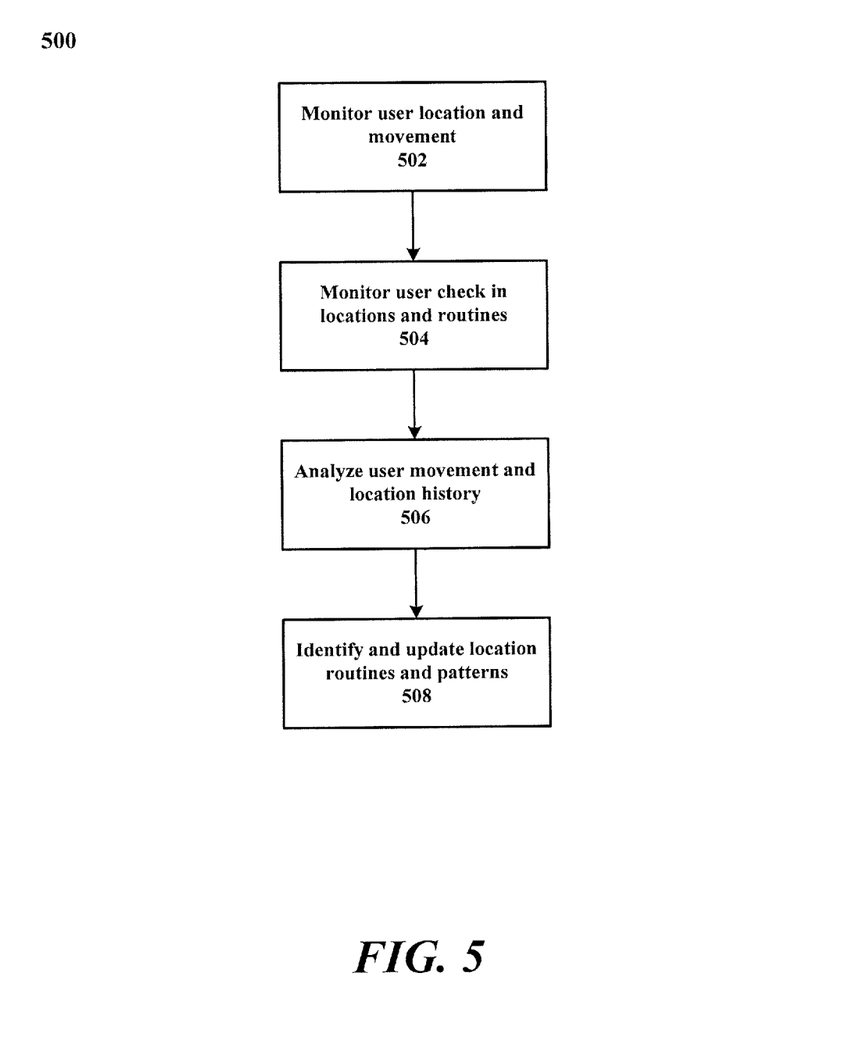
FIG. 5 is a flowchart illustrating a process for determining a user's routine locations and movements.

Referring now to FIG. 5, a process for determining user 110's routine locations and/or movements is illustrated. At step 502, the locations and/or movements of user 110 may be monitored. In particular, client computing device 102 may include a Global Positioning System (GPS) configured to detect locations and movements of client computing device 102 by detecting signals from GPS satellites. Client computing device 102 also may detect the locations and movements by detecting BLE beacons 108 installed at certain locations. For example, user 110's shopping routes inside a merchant's store may be detected and/or monitored via a grid of BLE beacons installed throughout the merchant's store. Thus, the user 110's locations and movements may be detected and monitored via various techniques including GPS, BLE beacons, and the like.

At step 504, the locations where user 110 checks in, when user 110 checks in, and the sequence user 110 checks in to various locations may be monitored. In particular, the system may monitor and map user 110's check in locations and may determine check in sequences at different locations to determine routes taken by user 110. For example, the system may determine that during a typical morning on a work day, user 110 starts from home, checks in to a coffee shop, a train station, a news stand, and then at work. Thus, the system may determine a typical route of user 110 based on the check in sequence at various locations.

At step 506, the system may analyze user movement and location history. In particular, the system may analyze user 110's movement and location history to determine certain routines or patterns taken by user 110. The routines may be determined based on certain times, days, months, seasons, and/or year. For example, user 110 may have different travel routines for weekdays and weekends. In another example, user 110 may have different routines for different days of the week, different seasons of the year, and the like. In an embodiment, the system may access, with user 110's permission, user 110's schedule, calendar, to-do list, and the like and may analyze the information to determine user 110's routines or upcoming locations to visit. The system may monitor and analyze a combination of different routines of the user.

At step 508, the system may identify location and/or movement routines and patterns from the location and movement history of user 110. In an embodiment, user 110's movement and locations within a merchant's location may be analyzed to determine routine shopping routes within the merchant's location. For example, user 110 may travel in a routine shopping route within a grocery store and the system may analyze and recognize user 110 typical shopping route within the grocery store based on user 110's location and movement history at the grocery store.

In an embodiment, the system may analyze check in history of user 110 where user 110 has checked in. The system may identify sequences of routine check-ins at different times of the day, different days of the week, months, or seasons of the year. For example, the system may determine that user 110 has a routine sequence of check-ins on weekends starting from home, a local café for brunch, gym, shopping mall, and then home. Based on user 110's check in history, the system may determine that this routine check-in sequence is repeated many times by user 110 on weekends. Thus, the system may identify this check-in sequence as a routine of user 110 on weekends. The system may continuously monitor and update user 110's location and movement and may update user 110's routines as user 110's routines may change over time. In an embodiment, the system may analyze and identify a combination of different travel routines and check-in routines of the user. For example, the user's routines may be determined or identified based on a combination of user's check-in activities, location history, and purchase history.

Accordingly, the system may implement process 500 to monitor user 110's locations and movements via GPS, BLE beacons, and BLE check-in at various locations. The system may analyze and identify user 110's travel routine both within a location and among different locations. The system may update user 110's routines by continuously monitoring and analyzing user 110's locations and movements.

Figure 6:
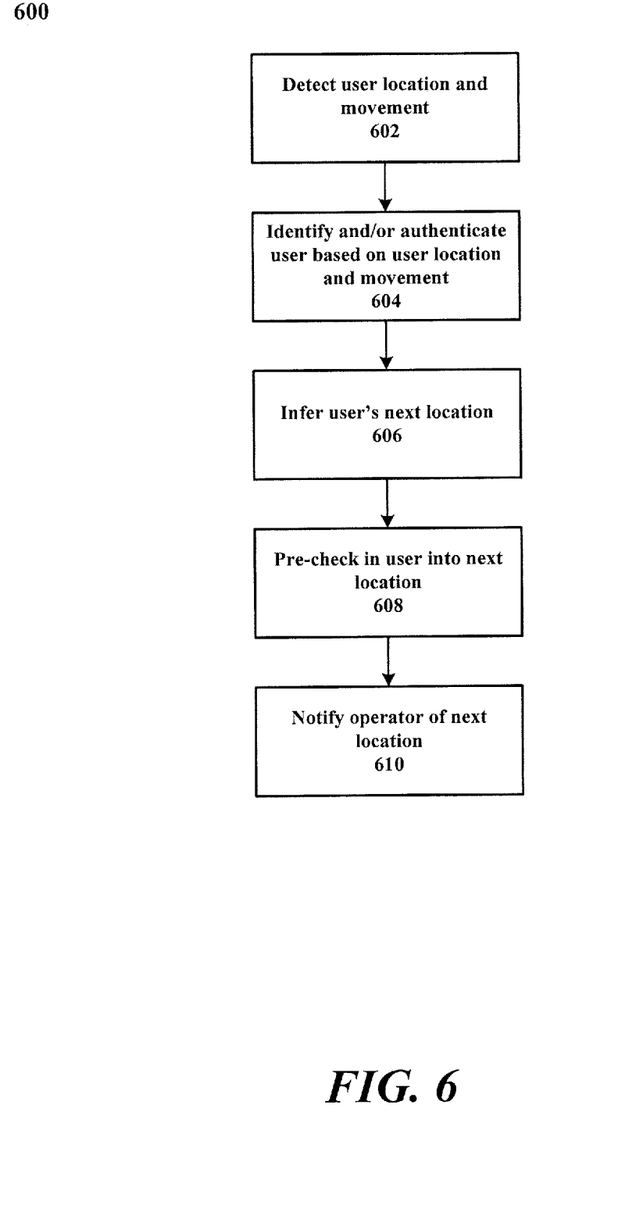
FIG. 6 is a flowchart illustrating a process for pre-check in a user into a next location.

Referring now to FIG. 6, a process 600 for pre-checking in a user is illustrated. At step 602, the system may detect user 110's location and/or movement. In particular, the location and movement of user 110 may be detected via client computing device 102 using GPS and/or BLE. For example, user 110's location and/or movement inside a merchant's location may be detected via BLE beacons installed in the merchant's location. In another example, user 110's location and/or movement may be detected via GPS device included with client computing device 102.

At step 602, the system may identify and/or authenticate user 110 based on user 110's location and/or movement. In particular, user 110's movement within a location or between different locations may be used to determine how likely the person carrying client computing device 102 is user 110 or the owner of client computing device 102. For example, the system may compare client computing device 102's current location or pattern of current movement within a location or between different locations with that of user 110's location and movement history and may determine whether the client computing device 102's current location or pattern of current movement match that of the user 110's routine locations and/or routine travel routes within a location or between different locations. The closer the current location and/or current movement of client computing device 102 match user 110's location and/or movement routines, the more likely the person operating client computing device 102 is user 110 or the owner of client computing device 102.

For example, client computing device 102 may detect that it has traveled from user 110's home to a coffee shop, checked in at the coffee shop, and then checked in to user 110's office building on a Monday morning. The system may determine that this is user 110's typical route on a Monday morning 90% of the time. Thus, the system may determine that there is a 90% likelihood that client computing device 102 is carried by user 110. In another example, client computing device 102 may detect that it has checked into a shopping mall and is traveling from the shopping mall's entrance to a food court, and then checked into a favorite store of user 110 in a Saturday afternoon. The system may determine that this is user 110's typical shopping route in the shopping mall on Saturday afternoon and may authenticate user 110 or access information about user 110 to help predict a subsequent checkin location accordingly.

At step 606, the system may infer user 110's next location based on user 110's current travel route and user 110's routine. In particular, based on user 110's travel routine and the current movement and location of user 110, the system may predict or infer user 110's next destination, as described in process 500. For example, user 110's travel routine on a Friday afternoon may be office, restaurant, grocery store, and then home. It's Friday afternoon and user 110 has left the office and is not at the restaurant. The system may predict or infer that, based on user 110's travel routine on Friday afternoons, the next location likely is the grocery store.

In an embodiment, the system may infer user 110's next location based on user 110's calendar, schedule, or to-do list. For example, based on user 110's calendar or schedule, the system may infer that user 110 will be attending a meeting at a particular office building this afternoon after visiting a client. As such, after user 110 checked in at the client's location this afternoon, the system may infer that user 110 will be visiting the particular office building for the meeting next.

In another embodiment, the system may infer user 110's next location based on social network accounts, online posting, or other communication made by or about user 110. For example, based on user 110's posting on a social network website or an email sent to other users, the system may determine that user 110 will be visiting a grocery store after getting a haircut at a barber shop. As such, after user 110 checks in the barber shop, the system may determine that user 110's next location is the grocery store. In another example, a friend posts that they are with user 110 and are planning on going shopping at Mall A after eating lunch. The system may then make a determination to pre-checkin user 110 at Mall A after the system sees that the friend has posted that lunch is just ending.

In an embodiment, the system may infer user 110's next location based on user 110's current movement or location. In particular, certain locations may be related or may be a combination of locations that user 110 typically visit in a sequence. As such, based on user 110's current location, the system may infer user 110's next location. For example, user 110 may typically visit a gas station after visiting a grocery store. As such, after user 110 is checked in at the grocery store, the system may infer that user 110's next location is the gas station.

In another embodiment, the system may infer user 110's next location based on user 110's current travel direction and/or travel routes. In particular, the system may detect user 110's current travel direction or travel route and may predict user 110's next destination based on the current travel direction and/or travel route. For example, user 110 may have a routine travel route to a shopping mall. As such, when user 110 is heading in the same direction of or traveling along the routine travel route toward the shopping mall, the system may infer that user 110's next location is the shopping mall. Thus, the system may pre-check user 110 into the shopping mall before user 110 arrives at the shopping mall. In another example, after user 110 checks into a train, the system may determine possible locations along the train route where the user may desire a pre-checkin.

In still another embodiment, the system may infer user 110's next location based on contextual information including one or more of the aforementioned factors. In particular, based user 110's travel routine, purchase history, current time, day, month, season, or year, or any other contextual information collected, the system may consider multiple factors to infer the next location where user 110 may visit and where user 110 may benefit from pre-checking into the next location.

At step 610, the system may allow user 110 to pre-check into the next location. In an embodiment, the system may inquire user 110 whether he or she would like to be pre-checked into the next location. For example, a message may be displayed on client computing device 102 "Would you like to pre-check into XX?" User 110 may respond yes or no. User 110 may be pre-checked into the next location if user 110 answered yes.

In an embodiment, user 110 may have agreed previously to be automatically pre-checked in to a system recommended or determined next location. For example, when the system determines that user 110 very likely is traveling to a next location, the system may automatically pre-check in user 110 into the next location before user 110 arrives at the next location. In an embodiment, the system may pre-check in user 110 when user 110 is traveling toward the next location and/or user 110 is within a predetermined distance from the next location.

In an embodiment, the system may allow user 110 to identify and pre-check in to a particular location, which is not within user 110's routine. For example, user 110 may be traveling to a new city and is staying at a particular hotel. The system may allow user 110 to pre-check into the particular hotel before user 110 arrives at the city or the particular hotel. In another embodiment, the system may access user 110's schedule or calendar and may pre-check in user 110 into a location based on user 110's schedule or calendar. For example, user 110 may be scheduled to visit a dental office according to user 110's calendar. The system may pre-check in user 110 into the dental office before user 110 arrives at the dental office or when user 110 is in route to the dental office.

In an embodiment, the system may pre-check user 110 into two or more locations within a series of locations when user 110 is visiting a series of routine locations. For example, user 110 may have a routine of visiting a series of locations A, B, C, D, and E. When user 110 has visited locations A and B and is now at location C, the system may pre-check user 110 into locations D and E, based on user 110's routine.

At step 612, the system may notify the operator of the next location regarding the pre-check in of user 110. In an embodiment, when user 110 is pre-checked in to a next location, the system may process this pre-check in and may send information including a universally unique ID (UUID) to client computing device 102. The information including the UUID may be store at client computing device 102 and may be used by the BLE beacons at the next location to check user 110 in and/or provide services, offers, and information associated with the checkin. In particular, remote server 104 may generate a UUID associated with client computing device 102 and user 110's payment account for a particular session. The UUID may have an expiration time. For example, the UUID may expire within two hours. As such, if user 110 does not visit or enter the location where user 110 is pre-checked in, the UUID may expire and user 110 may be required to perform a new check in at the location when user arrives at the location, because the pre-check in has expired.

In an embodiment, the system may notify the merchant when user 110 deviates from a specific pattern or routine. For example, if the user 110 decides to visit another location before visiting the merchant's location, the system may notify the merchant that user 110 may be late. In another example, if the user 110 decides not to visit the merchant, the system may notify the merchant and the merchant may send additional incentives to entice the user 110 to visit.

When user 110 arrives at the location where user 110 has been pre-checked in, client computing device 102 may communicate with BLE beacons installed at the location. Client computing device 102 may communicate the UUID and other user account or check in session information to the operator of the location via the BLE beacons. The operator of the location may verify the UUID received from client computing device 102 with the UUID previously received from remote server 104. If they match, the operator of the location may confirm that user 102 has been pre-checked at the location and may skip or omit the registration and/or authentication process for registering or authenticating user 110 at the location. Thus, by using the UUID to pre-check in user 110 at a location, user 110 may quickly be identified and authenticated when user 110 arrives at the location. For example, because user 110 is pre-checked in, the system may not have to perform full registration and authentication procedures to check user 110 in at the location.

In an embodiment, additional information may be notified to the operator of the next location to provide better service to user 110. For example, user 110's preferences, payment information, and other information may be forwarded to the operator of the next location to facilitate user 110's visit to the next location before user 110 arrives at the next location. In an example, user 110 may pre-check into a doctor's office and the doctor's office may have access to user 110's medical history, health information, payment information, and the like before user 110 arrives at the doctor's office. In particular, user 110's health information may be reviewed before user 110's arrival to speed up the patient registration process. In another example, user 110 may pre-check into a hotel before user 110 arrives at the hotel. As such, the hotel may receive user 110's lodging preferences, payment information, and the like, before user 110's arrival. The hotel may prepare a room for user 110 accordingly before user 110's arrival and may provide user 110 with access code to the room. Thus, user 110 may skip the check in process and may go straight to the room without having to stop at the front desk of the hotel.

In still another example, user 110 may pre-check into a building or an office before vising the office or the building. As such, the operator of the building or the office may anticipate user 110's visit and may print ID cards and arrange personnel to receive user 110's visit. Operators or merchants of certain locations may receive pre-check in from various users and may anticipate the number of visitors before they arrive. Thus, operators or merchants of locations may prepare for the number of visitors accordingly. For example, a plurality of users may pre-check into a restaurant. As such, the operator of the restaurant may anticipate how many people will be coming, prepare tables needed to accommodate the people, prepare the type of food for the type or age of visitors, and the like.

Accordingly, the process 300 may be implemented to pre-check in user 110 into a location, which is inferred by the system based on user 110's routine or identified by user 110. The operator of the location may be notified of user 110's pre-check in and may be provided with information to anticipate user 110's visit. In particular, the operator of the location may be provided with an UUID to quickly check user 110 in upon user 110's arrival without having to register and/or authenticate user 110. The operator of the location also may be provided with various information to better service user 110.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
a non-transitory memory; and
one or more hardware processors coupled to the non-transitory memory and configured to read instructions from the non-transitory memory to cause the system to perform operations comprising:
detecting, via communication with a first device corresponding to a first location, that a user is located at the first location;
based on detecting that the user is located at the first location, accessing a database to identify a location history corresponding to the user;
determining a second location based on the identified location history corresponding to the user;
in response to determining the second location, providing, via a user interface of a user device of the user, a digital offer for the second location; and
in response to detecting an input corresponding to the digital offer, automatically processing an electronic transaction corresponding to the second location before a detection of the user device at the second location.

2. The system of claim 1, wherein the electronic transaction is a pre-check-in of the user device at the second location.

3. The system of claim 2, wherein the pre-check-in includes associating the user device with an identifier and providing the identifier to the user device.

4. The system of claim 1, wherein the electronic transaction includes performing a purchase of an item or service.

5. The system of claim 1, wherein the detecting the input corresponding to the digital offer includes detecting a selection, via the user interface, of a user interface element corresponding to the digital offer.

6. The system of claim 1, wherein the location history is a check-in history corresponding to the user.

7. The system of claim 6, wherein the determining the second location is further based on analyzing a sequence of check-ins made by the user, wherein the sequence includes the first location and the second location.

8. A method comprising:
detecting, via communication with a first device corresponding to a first location, that a user is located at the first location;
based on detecting that the user is located at the first location, accessing a database to identify a location history corresponding to the user;
determining a second location based on the identified location history corresponding to the user;
in response to determining the second location, providing, via a user interface of a user device of the user, a digital offer for the second location; and
in response to detecting an input corresponding to the digital offer, automatically processing an electronic transaction corresponding to the second location before a detection of the user device at the second location.

9. The method of claim 8, wherein the electronic transaction is a pre-check-in of the user device at the second location.

10. The method of claim 9, wherein the pre-check-in includes associating the user device with an identifier and providing the identifier to the user device.

11. The method of claim 8, wherein the electronic transaction includes performing a purchase of an item or service.

12. The method of claim 8, wherein the detecting the input corresponding to the digital offer includes detecting a selection, via the user interface, of a user interface element corresponding to the digital offer.

13. The method of claim 8, wherein the location history is a check-in history corresponding to the user.

14. The method of claim 13, wherein the determining the second location is further based on analyzing a sequence of check-ins made by the user, wherein the sequence includes the first location and the second location.

15. A non-transitory machine-readable medium comprising a plurality of machine-readable instructions which when executed by one or more processors are adapted to cause the one or more processors to perform operations comprising:
   detecting, via communication with a first device corresponding to a first location, that a user is located at the first location;
   based on detecting that the user is located at the first location, accessing a database to identify a location history corresponding to the user;
   determining a second location based on the identified location history corresponding to the user;
   in response to determining the second location, providing, via a user interface of a user device of the user, a digital offer for the second location; and
   in response to detecting an input corresponding to the digital offer, automatically processing an electronic transaction corresponding to the second location before a detection of the user device at the second location.

16. The non-transitory machine-readable medium of claim 15, wherein the electronic transaction is a pre-check-in of the user device at the second location.

17. The non-transitory machine-readable medium of claim 15, wherein the electronic transaction includes performing a purchase of an item or service.

18. The non-transitory machine-readable medium of claim 15, wherein the detecting the input corresponding to the digital offer includes detecting a selection, via the user interface, of a user interface element corresponding to the digital offer.

19. The non-transitory machine-readable medium of claim 15, wherein the location history is a check-in history corresponding to the user.

20. The non-transitory machine-readable medium of claim 19, wherein the determining the second location is further based on analyzing a sequence of check-ins made by the user, wherein the sequence includes the first location and the second location.

\* \* \* \* \*